UNITED STATES PATENT OFFICE.

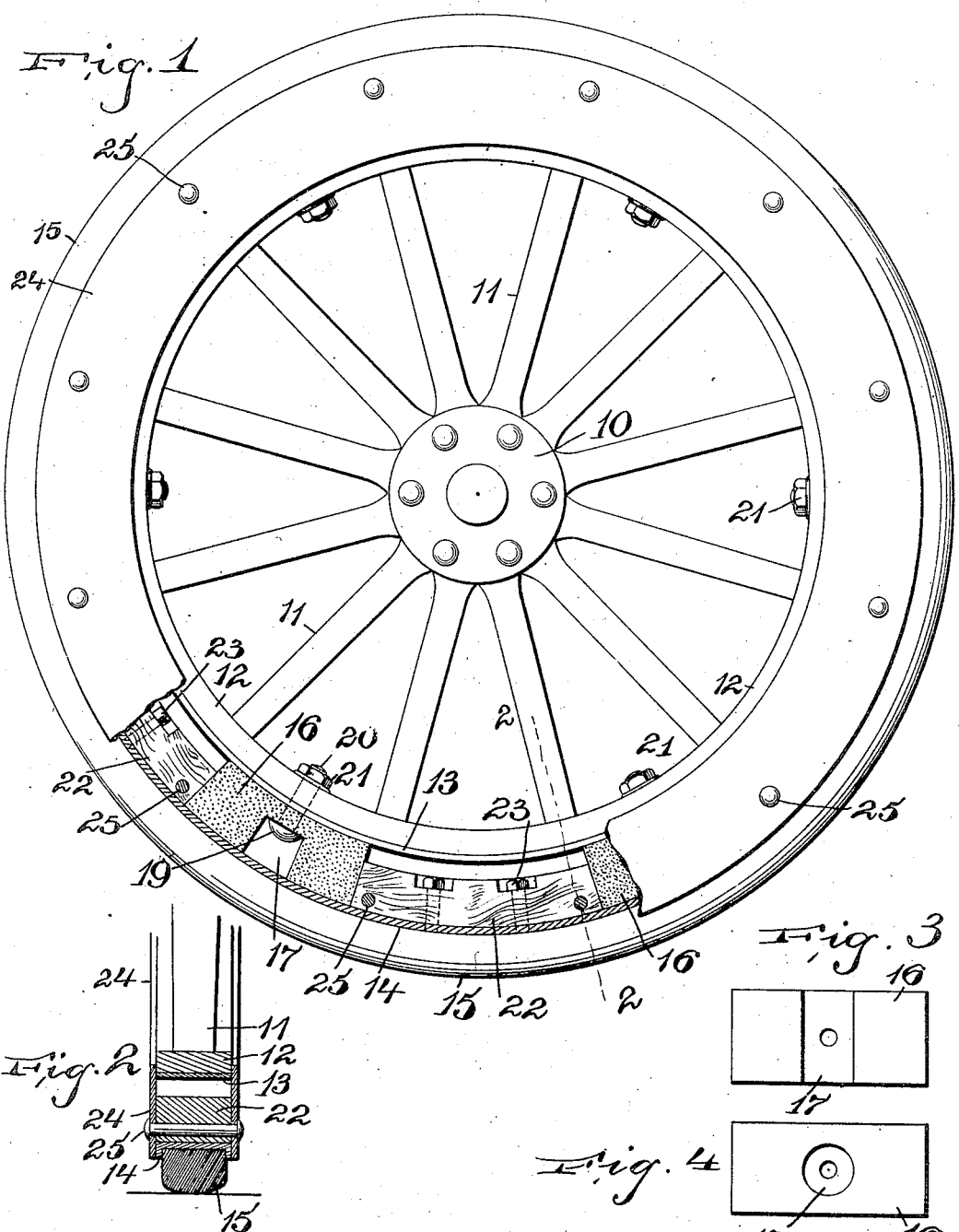

SAMUEL S. CHILDS AND WILLIAM CHILDS, JR., OF BERNARDSVILLE, NEW JERSEY.

SPRING-WHEEL.

No. 891,462.   Specification of Letters Patent.   Patented June 23, 1908.

Application filed May 25, 1907. Serial No. 375,580.

*To all whom it may concern:*

Be it known that we, SAMUEL S. CHILDS and WILLIAM CHILDS, Jr., citizens of the United States, residing at Bernardsville, in the county of Somerset and State of New Jersey, have invented certain new and useful Improvements in Spring-Wheels; and we do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to an improved wheel that is designed to give a spring action by means of a construction within the wheel, and is designed to dispense with inflated tires so that there is no danger of puncture, and at the same time to give sufficient resiliency to make an easy riding vehicle.

The invention is designed to provide a spring wheel, of this kind, that has alternate blocks of elastic material and solid blocks placed in between them, the solid blocks having a wedge action on the elastic blocks, these elements being placed between the felly and the rim. The blocks abutting also provide a circumferential transmission that gives an easy starting to the vehicle, and communicates power from the felly to the rim, or vice versa. The elastic blocks also provide for the spring of the wheel, and are therefore subjected to compressions in two directions, radially and in a circumferential direction.

The invention is illustrated in the accompanying drawing, in which

Figure 1 is a side view of the wheel with the metal dust plate broken away to show the spring portion of the wheel in elevation, the rim being shown in section. Fig. 2 is a section on line 2, 2, in Fig. 1, and Figs. 3 and 4 are bottom views of elastic blocks of different forms.

The wheel consists of any usual style of hub 10, spokes 11 and a felly 12, the felly 12 having, on its periphery, a band 13 which is preferably made of steel. Surrounding the felly, and at a considerable distance therefrom, so as to provide a space, is a rim 14 which is preferably of a channel construction, and is designed to hold any suitable tire 15 which may be of solid rubber, or of any suitable material. Disposed at suitable points in the space between the felly and the rim, are the blocks 16 which are recessed as at 17, which may be cut straight across as in Fig. 3, or in heavy constructions where strength is required, the recess can be made as at 18, in Fig. 4. This recess receives the head 19 of a bolt 20, and a nut 21, on each bolt, serves to secure the bolt and consequently the block of resilient material, to the felly. The edges of the block are cut so as to be radial with the hub.

Between each two blocks 16 are solid blocks 22; these blocks being preferably made of wood and secured to the rim by the screws 23, although other forms of fastening may be employed. The abutting edges of the blocks of solid material, with the blocks of resilient material, are cut to form faces in contact, and in this way when weight is supported by the wheel, the block between each two elastic or resilient blocks has a wedge action tending to force the resilient blocks apart, and in this way the necessary spring is secured. This is the case where the wheel is in the position shown in Fig. 1, but when a resilient block sustains the weight it is compressed radially.

We secure to the rim, on each side thereof, a metal dust plate 24, the dust plate being preferably secured by means of the bolts 25, the bolts passing through the wooden blocks, and the dust plates fit up tight against the sides of the wheel and prevent dust from getting into the contacting parts, the metal dust plates being preferably fastened to the blocks 22.

This construction provides a form of wheel in which the elastic blocks are not apt to be "sheared" or cut by any action to transmit power, and an extremely sensitive wheel is the result that rides easy over all obstructions and takes up the shock.

Having thus described our invention, what we claim is:—

A spring wheel comprising a body portion having a felly thereon, a rim surrounding the felly at a distance therefrom, solid non-elastic blocks arranged concentrically on the inside of the rim, the blocks being narrower than the space between the rim and the felly, resilient blocks filling the space between the felly and the rim and having radially arranged end surfaces to bear on the solid blocks, a bolt passing through the felly and into the resilient block and securing the block to the felly, the resilient block having a recess to receive the head of the bolt to allow compression of the material of the block when the block is compressed, said recess permitting a slight movement of one side of the block when torsional movement is applied to the wheel.

In testimony, that we claim the foregoing, we have hereunto set our hands this 23rd day of May, 1907.

SAMUEL S. CHILDS.
WILLIAM CHILDS, Jr.

Witnesses:
GUS A. MEYER,
E. A. PELL.